United States Patent [19]
Finkowski et al.

[11] Patent Number: 5,678,394
[45] Date of Patent: Oct. 21, 1997

[54] UNIVERSAL DOUGH CUTTING AND PACKING APPARATUS

[75] Inventors: James W. Finkowski, Andover; Jack Rejsa, Plymouth; Robert F. Meyer, Minneapolis; Glenn O. Rasmussen, Champlin, all of Minn.

[73] Assignee: The Pillsbury Company, Minneapolis, Minn.

[21] Appl. No.: 606,792

[22] Filed: Feb. 27, 1996

Related U.S. Application Data

[62] Division of Ser. No. 476,861, Jun. 7, 1995, Pat. No. 5,535,575, which is a continuation of Ser. No. 260,526, Jun. 16, 1994, abandoned.

[51] Int. Cl.$^6$ ............................................. B65B 63/00
[52] U.S. Cl. ........................ 53/516; 53/244; 53/252; 53/201
[58] Field of Search ............................ 53/244, 252, 258, 53/516, 520, 534, 201; 198/813, 814, 803.11, 803.14, 803.15; 83/284, 346, 123, 132, 167, 326, 504, 932

[56] References Cited

U.S. PATENT DOCUMENTS

| | | |
|---|---|---|
| 3,120,198 | 2/1964 | Reid . |
| 3,148,635 | 9/1964 | Reid . |
| 3,427,783 | 2/1969 | Reid . |
| 4,033,450 | 7/1977 | Paddock et al. .................. 148/803.15 |
| 4,128,952 | 12/1978 | Duke et al. ............................ 198/813 |
| 4,362,005 | 12/1982 | Hanaway ............................... 198/814 |
| 4,536,289 | 8/1985 | Wolkenstein ......................... 198/813 |
| 4,807,420 | 2/1989 | Barker ................................... 53/550 |
| 5,247,782 | 9/1993 | Rejsa ..................................... 53/516 |

*Primary Examiner*—Daniel Moon
*Assistant Examiner*—Gene L. Kim
*Attorney, Agent, or Firm*—Westman, Champlin & Kelly, P.A.

[57] ABSTRACT

A dough cutting and packing apparatus capable of processing and packaging dough products of differing dimensions includes a plurality of cutting plates supported adjacent one another to form an endless cutting unit. A container positioning mechanism positions a plurality of containers relative to the openings to receive the dough pieces after they are removed by the reciprocating packing mechanism. A servo motor drive actuation of both the cutter bar indexing drive system and the container advancement system allows for accurate positioning by reprogramming the servo drive for a particular product dimension rather than mechanically changing over to alternate equipment. A self-contained container advancement module can be removed and replaced with another container module suitable for delivering containers of different dimensions. A removable sprocket and chain system are dedicated to cutter bars of a particular size such that significant retooling is not required to change cutter bars and support chains in order to process dough products of different dimensions.

10 Claims, 5 Drawing Sheets

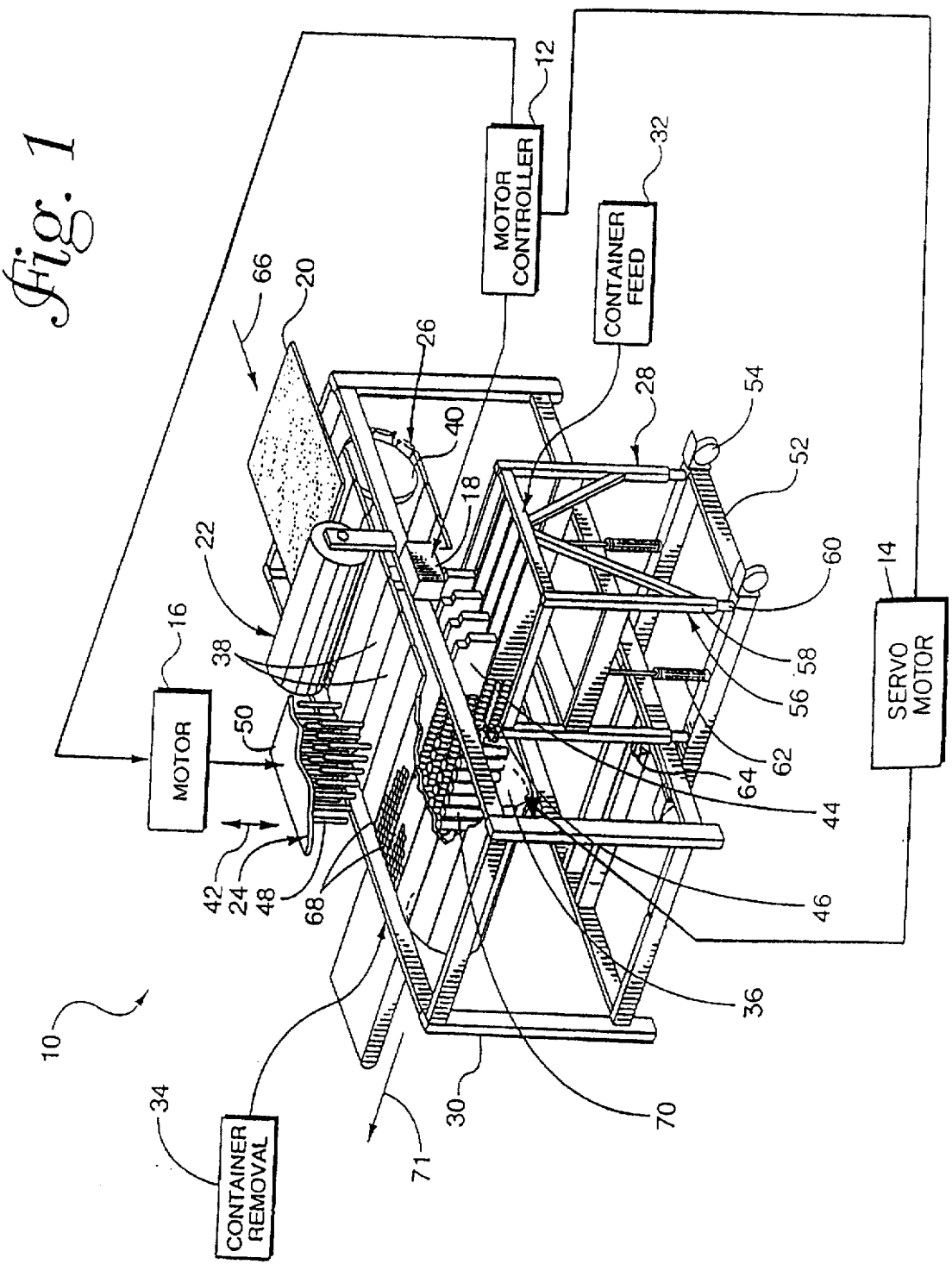

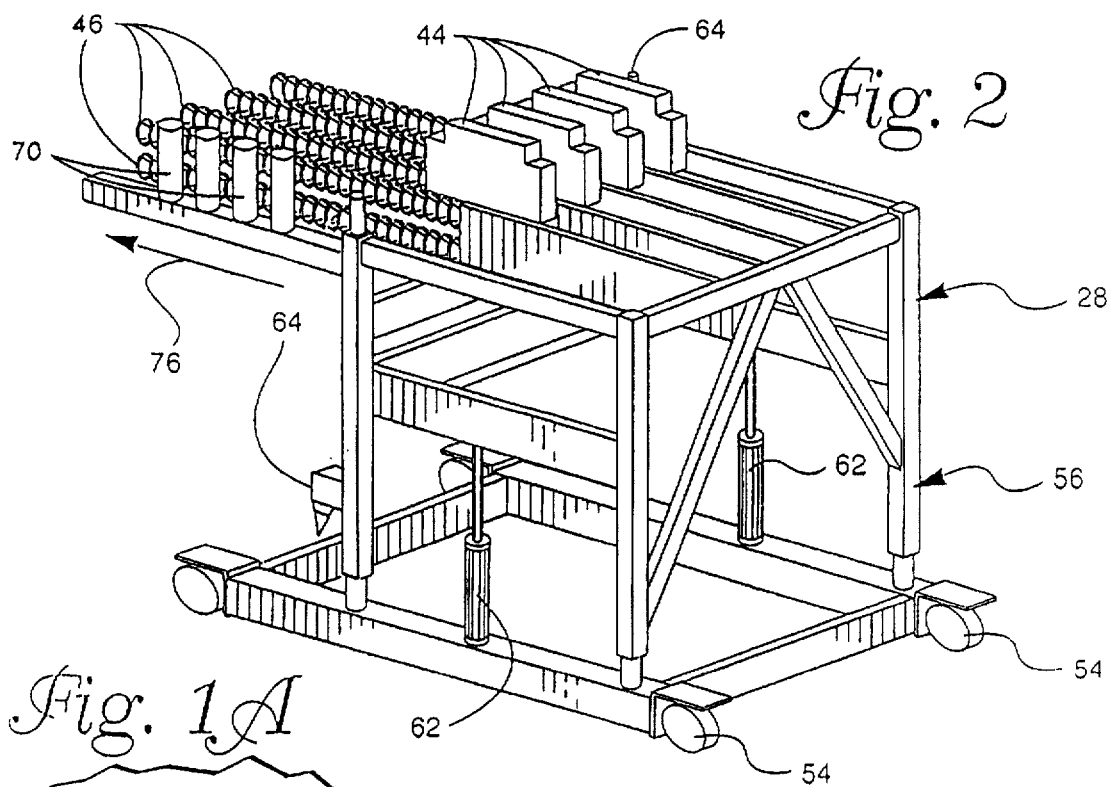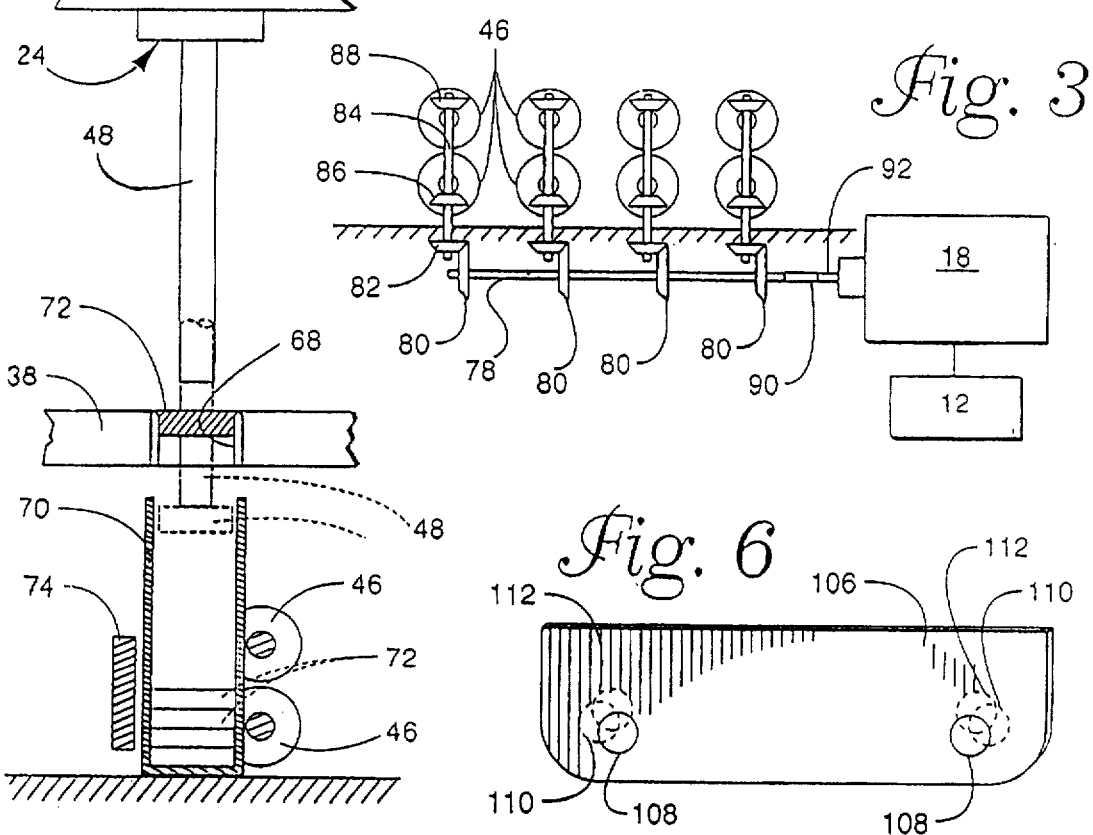

UNIVERSAL DOUGH CUTTING AND PACKING APPARATUS

This is a divisional of application Ser. No. 08/476,861, filed Jun. 7, 1995, now U.S. Pat. No. 5,535,575 which is a continuation of Ser. No. 08/260,526 filed Jun. 16, 1994 abandoned.

INCORPORATION BY REFERENCE

The following patents are hereby incorporated by reference:

U.S. Pat. No. 3,120,198 to Reid;
U.S. Pat. No. 3,148,635 to Reid;
U.S. Pat. No. 3,427,783 to Reid; and
U.S. Pat. No. 5,247,782 to Rejsa.

BACKGROUND OF THE INVENTION

The invention relates generally to dough cutting and packing devices. In particular, the present invention is a universal dough cutting and packing apparatus having a mechanism capable of transferring different size dough products to corresponding containers at a high rate of speed without the need for a separate cutting and packing device and without retooling manufacturing equipment prior to processing a different sized dough product.

Devices for cutting a sheet of dough into pieces and packing the dough pieces into containers are generally known. U.S. Pat. No. 3,427,783 to Reid, discloses one such dough cutting and packing apparatus. Improvements to the Reid apparatus are included in U.S. Pat. No. 5,247,782 to Rejsa.

In Reid, a retaining and releasing assembly is positioned above a center region of a cutting unit. The retaining and releasing assembly includes a plurality of retaining and releasing heads or tubes which are mounted to the cutting and packing apparatus for reciprocating movement through hex-shaped cups or openings in cutting plates carried by chains in the cutting unit. As the tubes move downward, they contact dough pieces retained within the hex-shaped openings in the cutting plates. Vacuum pressure throughout the tubes allows the tubes to retain the dough pieces as the tubes move through the openings in the cutting plates, thereby removing the dough pieces from the cutting unit.

Continued downward movement of the tubes causes the tubes to enter the open ends of containers positioned beneath the cutting unit. Thus, downward movement of the tubes is referred to as the packing stroke. Air expelled from the tubes causes the dough pieces to be deposited in the container. The length of the tubes are graduated so that the dough pieces are deposited in the bottoms of the container at the start of the packing operation and near the tops of the containers at the end of the packing operation until the containers are filled.

The containers are properly positioned for receiving the dough pieces by a plurality of pairs of laterally extending, horizontally disposed upper and lower flighted augers. Empty containers are delivered to a first end of the flighted augers by a first endless belt conveyor. A second endless belt conveyor removes filled containers from a second end of the flighted augers. As the containers move through the augers, the dough pieces are deposited in the containers.

The cutting unit is intermittently driven. An electric drive motor is coupled to a first gear box which in turn is coupled to a second gear box by a first shaft. The second gear box is coupled to the cutting unit through a first mechanical intermittent drive. The first intermittent drive allows the cutting unit to move in a step-wise manner to position successive cutting plates beneath the retaining and releasing assembly. The drive motor is further coupled to a crank through a third gear box. The crank is connected to the retaining and releasing assembly, and moves the tubes in a reciprocating fashion. The reciprocating movement of the tubes is synchronized with the step-wise movement of the cutting unit so that the cutting unit only moves when the tubes are not extending into or through the openings in the cutting plates.

In Rejsa, as in Reid, the dough cutting and packing apparatus includes an endless cutting unit having a plurality of cutting plates supported by carrier chains. The cutting plates have a plurality of dough retaining openings. The cutting unit is configured to receive a sheet of dough that is pressed into the cutting plates by a presser roller. The pitch of the cutting unit varies with the desired size dough product which also requires a specific carrier chain. The presser roller presses dough into cutter plates which divides the dough sheet into pieces which are held within the dough retaining openings in the cutting plates of the cutting unit. These dough pieces are carried to a packing mechanism which includes a plurality of retaining and releasing heads.

Rejsa also teaches improvements over Reid. The retaining and releasing heads or plungers are moved in a reciprocating fashion relative to the cutting unit by way of a microprocessor controlled servo motor. As the retaining and releasing heads move downward (i.e., through the packing stroke), they contact the dough pieces held within the retaining openings in the cutting plates.

Operation of the servo motor during this packing stroke is controlled by the microprocessor in two stages. In the first stage, the servo motor rapidly accelerates the retaining and releasing heads at a rate in excess of the rate of acceleration due to gravity. Acceleration continues until the retaining and releasing heads enter open ends of containers positioned beneath the cutting unit. In the second stage of the packing stroke, the servo motor rapidly decelerates the retaining and releasing heads which discharges the dough pieces from the heads and deposits the dough pieces in the containers. At the end of the second stage of the packing stroke, movement of the retaining and releasing heads ceases and the return stroke of the heads commences.

By providing the packing mechanism with a servo motor controlled by a programmable microprocessor, the dough cutting and packing apparatus can pack containers without the need of a pressure/vacuum blower and accompanying ducts, pipes, manifold assembly and noise as was used in Reid. Rather, the acceleration and deceleration techniques ensure proper packing without the use of air pressure in the retaining and releasing tubes.

In the systems taught by both Reid and Rejsa, each size dough product is based upon a particularly dimensioned hex-shaped cup. Thus, the length of the cutting plates in the cutting unit varies as the size of the product varies. This requires that the index (or distance) that the cutting unit must move for each stroke of the retaining and releasing heads is specific for each different size dough product.

The containers in Rejsa are moved relative to the packing mechanism in a similar manner to that taught by Reid. A container positioning mechanism defined by a plurality of pairs of flighted augers drive the containers such that the containers are intermittently stopped below respective retaining and releasing heads until the packing mechanism completes a packing stroke and transfers dough pieces from the cutting unit to the containers. Each container size is specific for only one size dough product. The can index profile is specific to the number of dough pieces packed per can and the width, or number of biscuits, of the cutter bar. The dough packer index rate is limited by the inertia of the machine and interference conditions of each cycle. Since alignment of the containers with the hex-shaped cup in the cutter bar is essential for the dough piece to be successfully packaged, the screw pitch and spacing of the flighted augers are specific for each dough product.

Further, the cutting plates are carried through the cutting and packing apparatus by chains driven by an indexing drive. The cutting plates are attached to links in the chains. The length and dimensions of the links are specific to a particular size dough product, as the cutting plates have a specific length, which is determined by the size of the biscuit and the number of biscuits in the cutter bar. Each size dough product, therefore, has a unique carrier chain link size and a drive sprocket which accommodates that chain link size.

Therefore, the present dough cutting and packing apparatus is dedicated to cut only one size dough product and to pack those dough pieces into corresponding sized containers. Each size product requires a particular hex cup size, cutting plate, carrier chain and container index screws or augers.

SUMMARY OF THE INVENTION

There is a need to provide the capability to pack any size product in one processing line. In particular, there is a need for a universal dough cutting and packing apparatus which can efficiently accommodate different size dough products by transferring the dough from the cutting unit to corresponding dough product containers, without dedicating entire processing lines to one size product or completely retooling one line to accommodate a different size dough product.

A dough cutting and packing apparatus includes a plurality of cutting plates supported adjacent to one another to form an endless cutting unit. A rotatable member is disposed relative to the cutting unit to press a dough sheet into the openings in the cutting plates to cut the dough sheet into a plurality of dough pieces. A reciprocating packing mechanism is positioned relative to the endless cutting unit to extend into the openings to remove the dough pieces from the openings. A container positioning mechanism positions a plurality of containers relative to the openings to receive the dough pieces after they are removed by the reciprocating packing mechanism. A variable cutter drive assembly is coupled to the endless cutting unit for advancing the cutting plates relative to the reciprocating packing mechanism. The cutting plates are advanced with each reciprocation of the reciprocating packing mechanism by a variable distance based on the length of the cutting plates.

In one embodiment of the present invention, the dough sheet is moved to the cutting unit by a constant velocity packer infeed belt. During packing, the dough is advanced during advancement periods and packed during dwell periods. As dough accumulates during the dwell periods, the velocity of a shuttle is slaved off the drive motor for the cutting plates and the packer infeed belt so that changes in the line speed of the cutting plates automatically re-adjust the shuttle motion to match the dough accumulation profile. A servo motor controls the translational motion of the shuttle, to accommodate the velocity of the accumulated dough, through a series of sprockets.

In another embodiment, a plurality of interchangeable sprockets and chains, each dedicated to a certain size product, are useable with a single cutting and packing apparatus. A pair of hubs mounted for driving the cutting unit accommodate the interchangeable sprockets. Overall chain length is varied slightly with pneumatic cylinder takeups controlling the tension of chains supporting the cutting plates. During a dough product size changeover, the pneumatic cylinders are retracted to allow slack in the chains to accommodate the line change. When the new size chain assembly is in place, the pneumatic cylinders are extended so the chains are at the proper tension.

Also, in one preferred embodiment, synchronously timed with the constant reciprocating vertical motion of the cutting and packing head, a modular screw or auger assembly is used to position containers to receive the dough pieces. The modular assembly includes flighted screws or augers and drive gear boxes mounted on a portable chassis. The screws are cantilevered to be positioned between a top and a return side of the cutter bar chains. A servo motor which remains on a frame of the universal dough cutting and packing apparatus is decoupled from the gear boxes during processing changeover. The servo motor provides easy variation in positioning control for various screw index profiles.

BRIEF DESCRIPTION OF THE DRAWINGS

FIG. 1 is an isometric view of a dough packing apparatus according to the present invention.

FIG. 1A illustrates packing of a dough piece into a container according to the present invention.

FIG. 2 is an isometric view of a container advancement module according to the present invention.

FIG. 3 is a partial block diagram showing a drive train in the module of FIG. 2.

FIG. 6 is a side view of a chain link according to the present invention.

DETAILED DESCRIPTION OF THE PREFERRED EMBODIMENTS

Overall Description of Apparatus 10

Figure 1B:
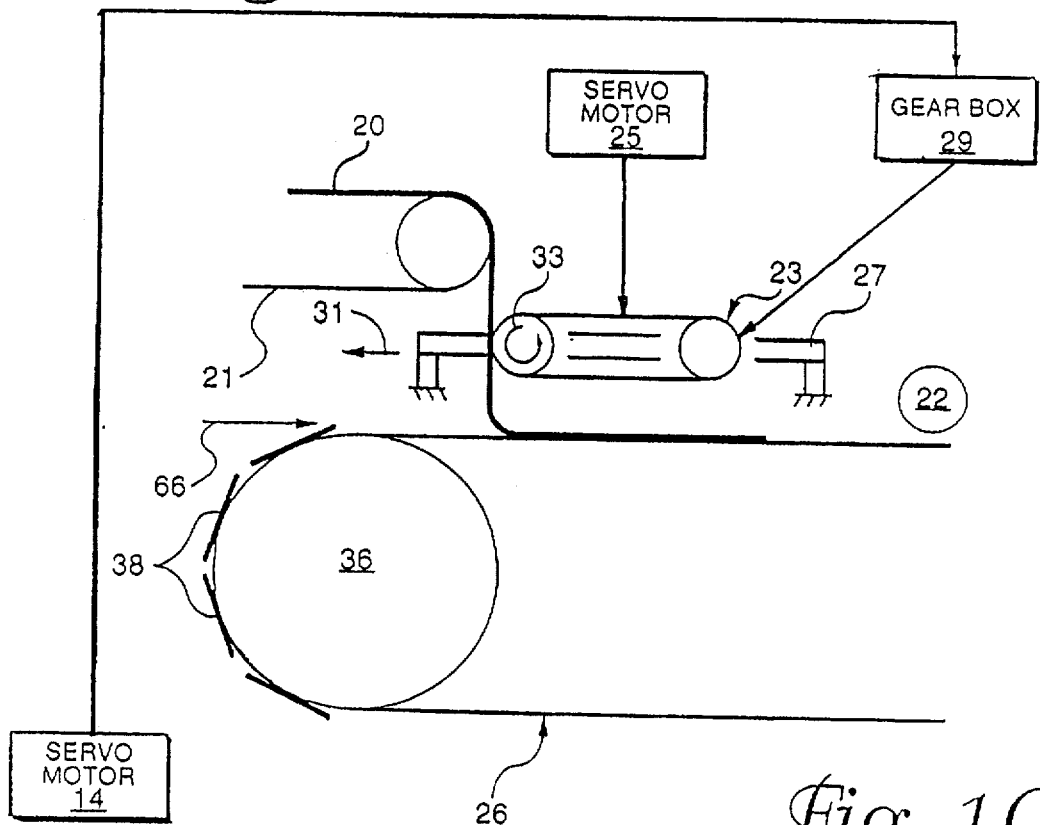
FIGS. 1B and 1C illustrate a dough accumulation shuttle of the present invention.

FIG. 1 is an isometric view of a dough cutting and packing apparatus 10 according to the present invention, shown partially in block diagram form. Apparatus 10 includes motor controller 12, servo motor 14, motor 16 (which can be any suitable motor such as a stepper motor, servo motor or AC motor), and servo motor 18, press roller 22, packing head assembly 24, cutter bar assembly 26, container advancement module 28, container feed mechanism 32 and container removal mechanism 34. Motor controller 12 is typically a digital computer, a micro controller, or another suitable control element, which is coupled to motors 14, 16 and 18. Servo motor 14 is coupled, through a drive shaft with a gearbox (not shown), to a drive roller 36 supported for rotation by frame 30. Drive roller 36 and idler roller 40 each have a pair of hubs supporting a pair of sprockets which mate with a pair of drive chains (the hubs, sprockets and drive chains are described in greater detail with respect to FIGS. 4, 5, and 6). The drive chains support a plurality of cutting bars 38 (described in greater detail with respect to FIGS. 4 and 5). The plurality of cutting plates 38 are coupled to one another by the drive chains, around the hubs of drive roller 36 and idler roller 40 to form an endless cutting unit of cutting bars 38.

Motor 16 is coupled to packing head assembly 24. Motor 16 drives packing head assembly 24 in a constant reciprocal motion in the direction indicated by arrow 42. Packing head assembly 24 includes a plurality of packing plungers or tubes 48 which extend out and away from a base plate 50.

Container advancement module 28 includes a base 52 supported by wheels 54. Module 28 also includes an upper portion 56 having four hollow members 58 mounted over four pins 60. Pins 60 are reciprocable within hollow members 58. The four hollow members 58 support gear boxes 44 and flighted augers or screws 46. In addition, the entire upper portion 56 of module 28 is supported for vertical movement by actuation of hydraulic (or pneumatic) cylinders 62. A pair of locator pins 64 extends downwardly from the upper portion 56 of module 28 and mate with a pair of locator apertures (not shown) on frame 30. The locator pins are preferably cone shaped so as to be self-centering in the apertures. Servo motor 18 is mounted on frame 30 and has a drive shaft releasably coupled to gear boxes 44. Servo motor 18 drives rotation of augers 46 through gear boxes 44. This is described in greater detail in reference to FIG. 3.

In operation, a dough sheet 20 is advanced between press roller 22 and drive roller 36 in the direction indicated by arrow 66. Each of the cutter bars 38 may be formed of a suitable rigid material defining a plurality of hexagonal-shaped openings 68. As dough sheet 20 moves between press roller 22 and the particular cutter bar 38 then located between press roller 22 and drive roller 36, press roller 22 presses the dough into the hexagonal-shaped openings 68 in the cutter bars 38 below press roller 22. This causes the dough to be separated into hexagonally-shaped dough pieces.

The dough pieces are retained within the openings 68 in cutter bars 38, and the cutter bars 38 are advanced in the direction indicated by arrow 66 toward packing head assembly 24. During advancement of cutter bars 38, container advancement module 28 advances a plurality of containers 70 in a direction indicated by arrow 71 transverse to the direction of movement of dough sheet 20. The containers 70 are fed to module 28 by container feed mechanism 32 which is any known, commercially available, container feed mechanism, such as an endless conveyor.

As the cutter bars 38 advance to a position beneath packing head assembly 24, packing head assembly 24 reciprocates downward and plungers 48 extend through openings 68 in cutter bars 38. Thus, plungers 48 press the dough pieces retained in openings 68 down, out the bottom of cutter bars 38. Plungers 48 carry the dough pieces into containers 70 which are positioned beneath openings 68 by the flighted augers 46 of module 28.

FIG. 1A is an enlarged view of a portion of packing head assembly 24 positioned above an opening 68 and a cutter bar 38. FIG. 1A also shows a container 70 positioned below opening 68 for receiving a dough piece 72 from openings 68. As head assembly 24 reciprocates downward, finger 48 engages dough piece 72 and carries it downwardly into container 70 which is positioned below openings 68. FIG. 1A also shows that container 70 is located below opening 68 by a pair of flighted augers 46 driven by one of the gear boxes 44 on module 28. The augers 46 and guide member 74 form a guide passage through which containers 70 are advanced until they are filled with dough pieces 72. The advancement of container 70 is set out in greater detail in U.S. Pat. No. 5,247,782 to Rejsa which is assigned to the same assignee as the present application, and which is hereby incorporated by reference.

Referring again to FIG. 1, once the dough pieces 72 shown in FIG. 1A are removed from openings 68 in a particular cutter bar 38, the endless cutting unit is advanced by servo motor 14 so that the next subsequent cutter bar 38 is positioned beneath packing head assembly 24. The containers 70 are advanced by servo motor 18 in the transverse direction indicated by arrow 71 to be positioned beneath the next subsequent openings 68 in the cutter bar 38. Packing head assembly 24 again reciprocates downward and packs another dough piece in the containers 70.

Advancement of the cutter bars 38 and containers 70 is repeated, and dough pieces are placed in containers 70, until containers 70 are full. At that time, containers 70 are removed from dough packing apparatus 10 by a conventional container removal device 34 which is preferably any suitable, commercially available, container removal device, such as an endless conveyor.

An infeed belt customarily feeds dough sheet 20 to cutting and packing apparatus 10 at a constant, continuous velocity. It will be apparent, however, that advancement of cutter plates 38 is only performed intermittently between reciprocal strokes of head assembly 24. In other words, a first cutter bar 38 is advanced to a position under head assembly 24. Then, advancement of the cutter bars 38 stops and head assembly 24 reciprocates to remove dough pieces from the cutter bar under head assembly 24. In the preferred embodiment, head assembly 24 removes some of the dough pieces from each of three cutter bars per stroke. Thus, after three indexes, a bar 38 is emptied of substantially all dough pieces. After the dough pieces are removed, the cutter bars 38 are again advanced until the next subsequent cutter bar is positioned under head assembly 24 at which time reciprocal motion of head assembly 24 removes the retained dough pieces 72 from openings 68 in the cutter bar 38. This action continues throughout the packing operation. The period during which cutter bars 38 are advanced is referred to as an advancement time period and the period during which dough portions are being removed by reciprocation of head assembly 24 is referred to as a dwell time.

Shuttle 23

Figure 1C:
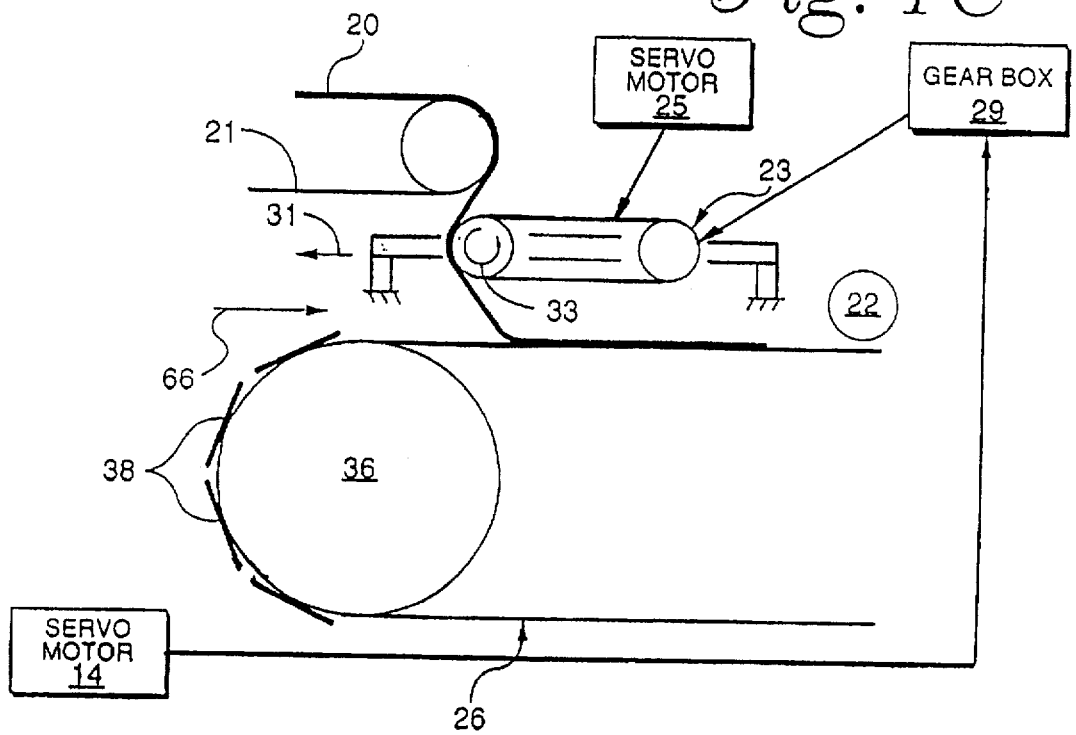

FIGS. 1B and 1C show a shuttle assembly according to one preferred embodiment of the present invention. The shuttle construction and operation is described in greater detail in U.S. Pat. Nos. 3,120,198 and 3,148,635 to Reid which are incorporated by reference. Briefly, the shuttle 23 is designed to accumulate dough during dwell periods of the cutter bars 38, and deposit the dough with apparatus 10 during the index cycle.

During dwell time periods, shuttle 23 is provided to accommodate the dough being delivered by an infeed belt 21. Shuttle 23 is translationally moved in the direction indicated by arrow 31 along guideways 27. In the preferred embodiment, guideways 27 are defined by an extended portion (not shown) of frame 30. During dwell time periods, shuttle 23 moves into dough sheet 20 (as shown in FIG. 1C) so that dough fed from indeed belt 21 is accumulated partially on the top surface of shuttle 23. Then, during a subsequent index cycle, shuttle 23 is controlled to move back, away from dough sheet 20. This causes shuttle 23 to feed accumulated dough back down to the cutter bars 38 on cutting assembly 26 during index cycles. In order to operate properly during both dwell time periods and index cycles, two separate inputs are required to operate the shuttle 23.

While the detailed operation of shuttle 23 is illustrated by Reid, a short explanation of the inputs controlling shuttle operation is appropriate. Dough sheet 20 is fed to the apparatus 10 at a constant velocity which is a function of the index length (the length bars 38 are moved during each index cycle) and the cycle rate. During dwell periods, the conveyor belt speed of the shuttle 23 will continue to match the constant dough velocity, while the frame of shuttle 23, sliding on linear guide rails 27, moves in the opposite direction (indicated by arrow 31) of the dough flow at one half the dough velocity to accumulate the dough.

As described in Reid's patents, the shuttle conveyor motion is a result of a continuous rotational velocity which rotates a drive pulley (not shown) which drives the conveyor of shuttle 23. In one embodiment, the constant velocity is provided from a constant speed drive (such as motor 16) of the packing head assembly through a line shaft (not shown) and gear box 29.

The shuttle 23 also has a separate speed input based on the index motion of the cutter bars 28. However, during dwell periods, the drive chain which provides the index input is stationary. Since the shaft of the drive pulley driving the shuttle conveyor is common and locked with sprockets of both the constant speed drive and index input, the continuously driven sprocket coupled to shuttle 23 tends to walk along the stationary drive chain similar to a rack and pinion.

As each product has a specific index distance or index length (due to specific product sizes), the conveyor speed of feed belt 21 is also specific and equal to the index cycle rate x the index length. Consequently, although the drive pulley sprocket can remain the same for each product, the drive ratio is changed. During changeover of the removable sprockets for the cutter bars 38 on the tail shaft 40 (described in greater detail later in the specification), drive sprockets for the shuttle 23 from the constant speed shaft are also changed. For example, for each cycle of the packing head assembly 24, the constant speed shaft driving shuttle 23 is reduced 4:1 to produce 0.25 revolutions per stroke of the packing head assembly 24. The following additional reduction ratio, created by a change of one sprocket, will be required to move the shuttle frame one half the distance of the specific index length and to move the frame at one half the instantaneous velocity of the cutter bars 38:

| Product Can Diameter | Reduction Ratio | Index Length |
| --- | --- | --- |
| 2 inches | 2.6 | 6.5 inches |
| 2 ¼ inches | 3.0 | 7.5 inches |
| 2 ⅞ inches | 2.85 | 7.125 inches |

The shuttle pulley drive sprocket driving shuttle 23 is preferably a 20 tooth sprocket with a ½" pitch to produce the appropriate movement.

As the apparatus 10 initiates the index portion of the cycle to advance a cutter bar 38, dough must be delivered to the cutter bars 38 in a continuous, relaxed manner. Input of the index speed to the shuttle 23 on conventional machines is through a sprocket drive from the tail shaft 40 of the apparatus 10. Changeover of the packing apparatus 10, due to the differences in the sprockets used to drive the cutter bars 38, requires a complicated sprocket replacement to achieve the corresponding speed and index match for shuttle 23. Consequently, input of the translational motion profile of shuttle 23 along guide rails 27 is preferably provided by the previously stationary drive chain, but the rotational input to the drive chain is provided by a servo motor 25 which is synchronously matched to the motion profile of the cutter bar servo drive 14. Shuttle speed selection is preferably defined by a menu selection for the servo and the sprocket substitution previously described.

As the index cycle is shorter than the dwell period, the speed of the index chain providing the index input to shuttle 23 is greater than the constant speed chain coupled to shuttle 23. Consequently, as described in greater detail in the Reid patents, the index input will override the constant speed input, and cause the drive pulley sprocket to walk along the constant speed chain. As a result, the shuttle frame moves in the direction of the cutter bars 38 reversing the movement and exact stroke length of the shuttle frame developed during the previous dwell cycle of the packing apparatus 10. Also, as described in Reid, the shuttle belt speed remains constant, allowing the dough to be transferred at a constant speed, although the velocity component due to the index has been added to the frame velocity of shuttle 23.

In prior systems, drive roller 36 and gear boxes 44 were cam driven by a large cam system synchronized with the motor driving packing head assembly 24. Thus, with each stroke of packing head assembly 24, cutter bars 38 would be advanced a given, non-variable distance. In addition, with each stroke of head assembly 24, containers 70 would be advanced in the transverse direction 71 by a given, non-variable, distance. However, dough products are produced in varying sizes in which the diameter of one dough product differs from that of other dough products. Thus, the size of the openings 68 also change with each product size variation. With this variation in the size of openings 68, the pitch (or length) of cutter bars 38 changes. Thus, the distance that each cutter bar must move in the direction indicated by arrow 66 with a reciprocation of packing head assembly 24 changes with each different product dimension. In addition, since the diameter of the holes in cutter bars 38 changes, the distance which containers 70 must move in the transverse direction to be properly positioned beneath openings 68 also changes with each differing product dimension. Thus, prior systems required completely different augers 46, different support chains supporting cutter bars 38, complete retooling of the cam systems driving augers 46 and drive roller 36, or completely separate packing lines for each product having a different dimension.

By contrast, the present invention provides shuttle 23, module 28, servo motor drives 14 and 18, motor 16, and a cutting unit removal system for quickly and easily removing cutter bars 38 and replacing them with cutter bars of different dimension. All of these features allow apparatus 10 to operate in a universal fashion.

Module 28

The present invention provides module 28 which is easily removable from apparatus 10 to change auger dimensions. For removal, cylinders 62 are engaged to either raise or lower the upper portion 56 of module 28, thus disengaging locator pins 64 from the locator apertures in frame 30. Module 28 can then be easily removed from the system since it is supported by wheels 54. A module having augers 46 with different dimensions can easily be inserted into system 10, without the need for removing any augers or changing any cam systems.

FIG. 2 is an enlarged elevational view of container advancement module 28 removed from system 10. For the sake of clarity, a number of containers 70 are shown placed between flighted augers 46. As flighted augers 46 rotate, the containers contained in the flights of the augers on either side of the augers, are driven in the direction indicated by arrow 76. Thus, by accurately controlling the rotation of flighted augers 46, containers 70 are accurately locatable beneath the openings 68 in cutter bars 38.

FIG. 3 illustrates the operation of gear boxes 44 on module 28. For the sake of clarity, the covers of gear boxes 44 are removed. A rotatable drive shaft 78, coupled for rotation to the upper portion 56 of module 28, has a first plurality of beveled gears 80. Beveled gears 80 meet with a generally opposing second plurality of beveled gears 82 which are each rigidly coupled to rotatable shaft 84. Shaft 84 includes a pair of opposing beveled gears 86 and 88 which engage flighted augers 46.

Drive shaft 78 is coupled via a disconnectable linkage 90 to output shaft 92 of servo motor 18. As discussed with respect to FIG. 1, servo motor 18 is connected to frame 30 and is controlled by motor controller 12. Thus, as motor controller 12 controls servo motor 18 so that output shaft 92 rotates, rotational power is transferred to rotatable shafts 84 by the interaction of beveled gears 80 with beveled gears 82. This rotation is transferred to augers 46 by the interaction of beveled gears 86 and 88 with augers 46.

Cutting Assembly 26, Removable Carrier Chains 94 And Removable Sprockets 96

Figure 4:
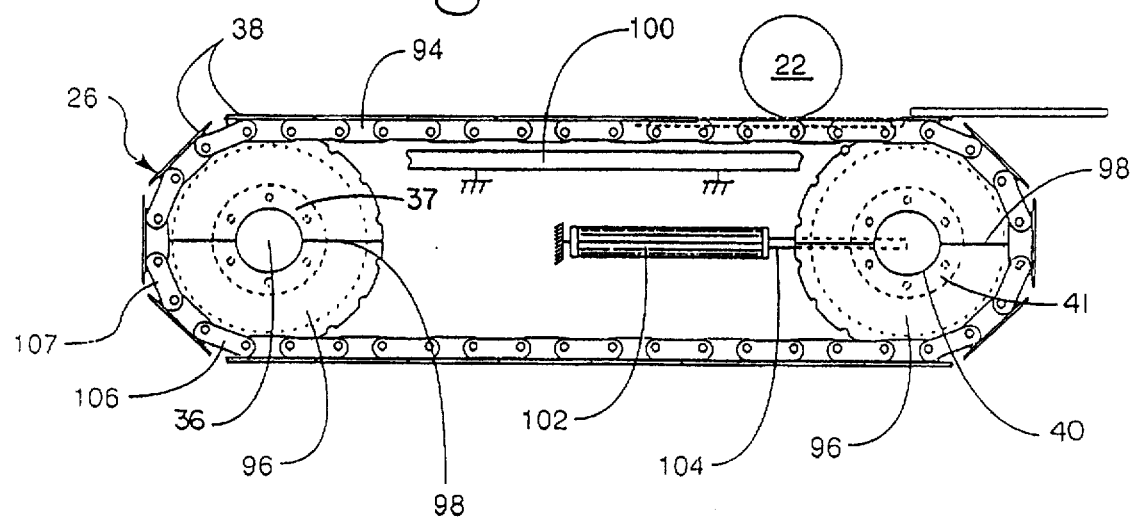
FIG. 4 is a side view of a chain assembly according to the present invention.

FIG. 4 shows a side view of cutting assembly 26 in greater detail. Cutter bars 38, when not rounding the hubs 37 and 41 or rollers 36 or 40, abut one another to form a substantially continuous cutting plane. Cutter bars 38 are coupled to a pair of parallel carrier chains 94 (only one of which is shown in FIG. 4). The cutter bars 38 are preferably coupled to the center of every other link in chains 94.

Figure 5:
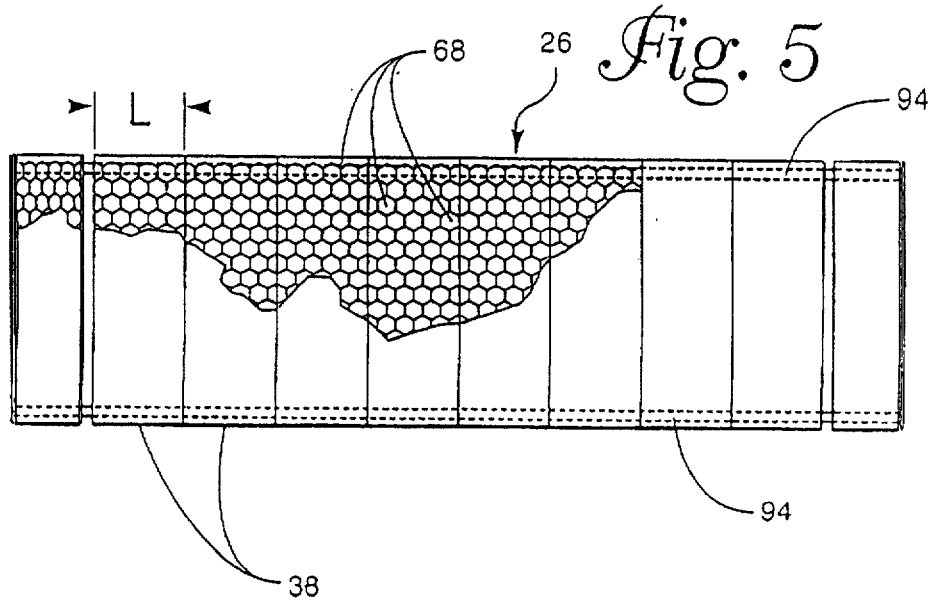
FIG. 5 is a top view of the chain assembly shown in FIG. 4.

FIG. 5 shows a top view of cutting assembly 26 with chains 94 shown in phantom. As discussed with respect to FIG. 1, different sized dough products require openings 68 in cutter bars 38 to have different dimensions. With different sized openings 68, the length L of cutter bars 38 changes.

Referring again to FIG. 4, in order to have cutter bars 38 attached to the center of every other link in chains 94, the dimension of the links must change as the length of the cutter bars 38 changes. Chains 94 are carried by sprockets 96 which are mounted about hubs 37 and 41.

Since the dimension of the links in chains 94 changes with each different product dimension, the length of chains 94 also changes slightly. However, it is important to maintain the upper surface of cutting assembly 26 at the same elevation so that it is the same relative distance from the tops of the containers 70 positioned between flighted augers 46 during operation. Thus, guide rails 100 are provided for supporting the chain 94 as it passes between hubs 37 and 41. Guide rails 100 are removably connected to frame 30 so they can be changed with different products, if desired.

Since the length of chain 96 changes, slightly, a pneumatic (or hydraulic) cylinder 102, is provided. The cylinder 102 is coupled to frame 30, and a piston 104, reciprocable within cylinder 102 is coupled to idler roller 40 which is contained in a suitable slide arrangement (not shown). When chains 94 having a slightly greater length are installed on apparatus 10, cylinder 102 is controlled (via an actuator, not shown) such that piston 104 extends out of cylinder 102 to take up any slack in the new chains. Conversely, when the chains 94 have a slightly shorter length, cylinder 102 is controlled to withdraw piston 104 to accommodate the shortened chain. Thus, cylinder 102 provides constant chain tension and adjustability.

Since the dimension of the links in chains 94 changes with each change in cutter bar length L, the dimension of the teeth on the outer radius of sprockets 96 must also change to accommodate the change in link dimension. Sprockets 96 of the present invention are split sprockets, preferably symmetrically split along seams 98, and removably coupled to hubs 37 and 41 on rollers 36 and 40. In the preferred embodiment, sprockets 96 are bolted to hubs 37 and 41.

In accordance with the present invention, chains 94 are removable from sprockets 96. The entire removal operation for removing chains 94 from apparatus 10 is described in greater detail with respect to FIG. 7. However, in order that chains 94, which are at a specified pitch, may be removable from apparatus 10, chains 94 are provided with a disconnectable chain link 107.

FIG. 6 is an enlarged view of an alternative embodiment of a link 106 in chains 94. Using link 106, the length of the links in chains 94 need not change for different length dough products. In order to keep the links the same overall length, link 106 remains the same size, but the holes are positioned slightly differently for different products. Thus, link 106 shows an aperture 108 formed in the link 106. In addition, link 106 shows two alternative apertures 110 and 112 (shown in phantom) formed in link 106, for products having varying dimensions. Thus, by using link 106 as in FIG. 6 there is no need to change guide rails 100, as shown in FIG. 4 when changing to another product dimension.

Changeover To Pack New Product Dimension

Figure 7:
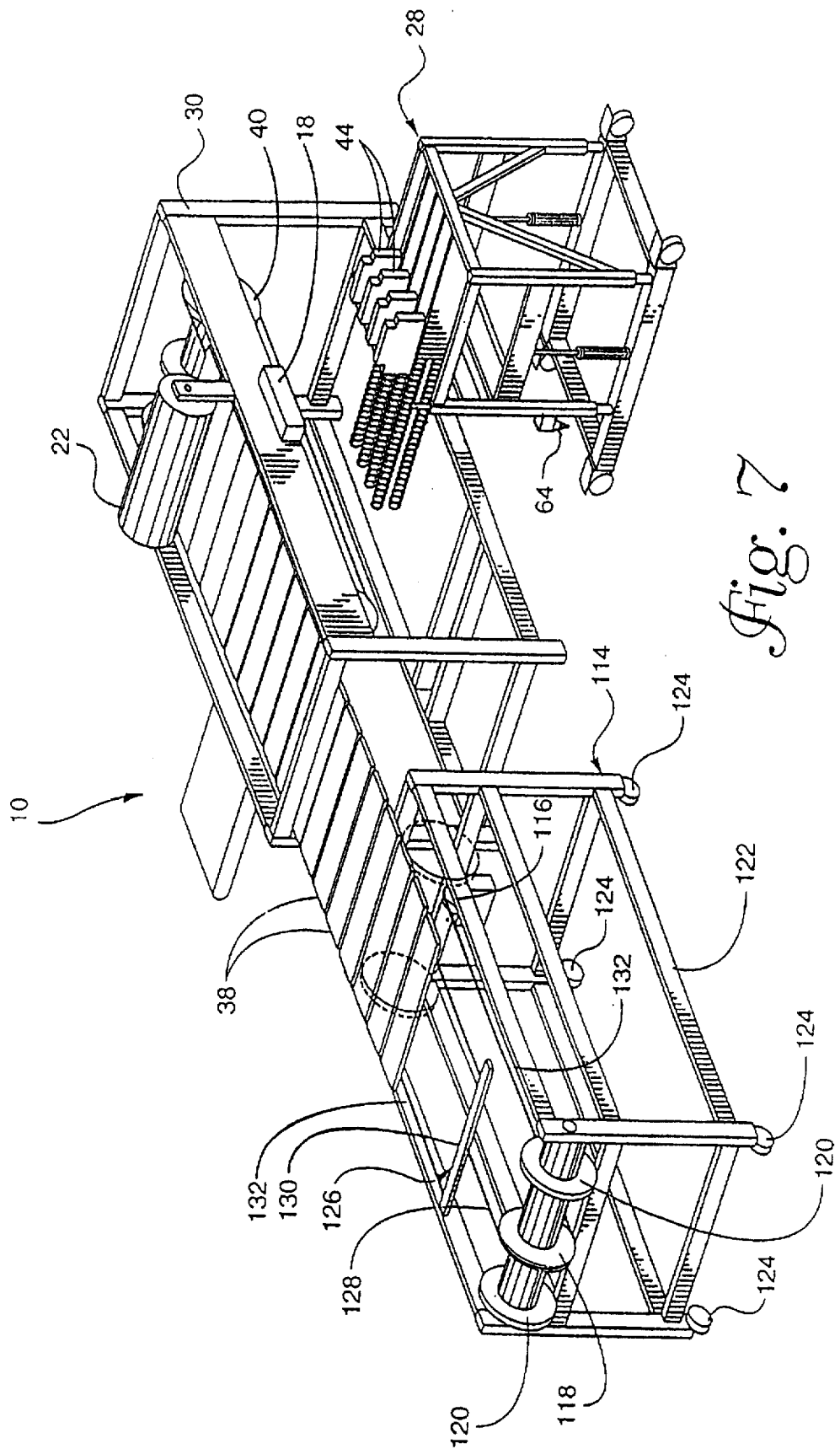
FIG. 7 is an isometric view of a cutter bar changeover system According to the present invention.

FIG. 7 illustrates a portion of apparatus 10 being reconfigured to cut and pack a product having a different dimension than the product for which it was originally configured. Module 28 is first disconnected from apparatus 10. Gear boxes 44 are disconnected from servo motor 18. Upper portion 56 of container advancement module 28 is then raised to disengage locator pins 64 from the locator apparatus in frame 30. Container advancement module 28 is removed from apparatus 10 (by wheeling it away from apparatus 10) and replaced with a second container advancement module 28 having augers 46 with different flighting dimensions.

The locator pins 64 on new module 28 are aligned in the locator apertures on frame 30. Finally, the gear boxes 44 on new module 28 are coupled to servo motor 18.

Cutting unit storage cart 114 is then provided for changing over cutter bars 38 and chains 94. Cart 114 includes a winch 116, and shaft 118 coupled to sprockets 120, all supported by a frame 122, which in turn, supported by wheels 124. A draw cable assembly 126 is coupled to winch 116, around sprocket 120. Assembly 126 includes a cross bar 130 and chain locking cables 132.

In order to remove the cutter bars 38, the disconnectable link in each of chains 94 is first disconnected so chains 94 no longer form an endless loop. Then, cart 114 is placed adjacent frame 30 and cable 128 is withdrawn from winch 116. Assembly 126 is located so that connector cables 132 are connected to chains 94 supporting cutter bars 38. Winch 116 is activated to withdraw cable 128, thus pulling the cutter bars 38 and chains 94 out of apparatus 10. Sprockets 120 are sized to fit the particular chain being removed from apparatus 10. Therefore, as winch 116 withdraws cable 128, assembly 126 pulls chains 94 around sprockets 120. Cable 128 is further withdrawn into winch 116 so that chains 94 move around sprockets 120 and back toward winch 116.

When the cutter bars 38 and chains 94 have been entirely removed from apparatus 10, sprockets 96 are removed from the hubs on drive roller 36 and idler roller 40. The storage cart 114 is withdrawn from apparatus 10.

Another storage cart, containing chains having cutter bars 38 with desired dimensions, is placed adjacent frame 30. New sprockets 96 are bolted to the hubs 37 and 41 of drive roller 36 and idler roller 40 in apparatus 10. The draw cable assembly 126 of the new cart 114 is pulled within the frame 30 of apparatus 10 and up around idler roller 40, back to cart 114 and locked onto the new chains 94 which reside on cart 114. Winch 116 is activated and the chains 94 and cutter bars 38 are drawn onto apparatus 10 around rollers 36 and 40. When chains 94 have advanced to a point where the chains 94 are end-to-end around rollers 36 and 40, the removable link in each of chains 94 is connected to form the endless cutting unit required to cut and pack products having the new dimensions.

CONCLUSION

The present invention includes a number of features which combine to form a universal dough cutting and packing apparatus. First, the present invention provides servo motor drive actuation of the container advancement system and the cutter bar indexing drive system. Thus, no matter how big the containers, or no matter how long the cutter bars, they can be positioned accurately and easily relative to one another and relative to the cutting and packing head assembly by simply reprogramming the motor controller, and changing sprockets. Only minimal mechanical changeover is required.

In addition, the present invention provides a self-contained container advancement module which can be easily removed and replaced with another container advancement module suitable for delivering containers of different dimension. This provides a high degree of flexibility in the system without retooling and without removing large cam devices found in previous systems.

The present invention also provides a removable sprocket and chain system in which sprockets and chains are each dedicated to cutter bars of a particular size. This provides flexibility to change cutter bars and support chains without any significant retooling and in a very time efficient manner.

The present system also provides a slaved shuttle assembly. The shuttle assembly accommodates accumulated dough which gathers during dwell periods.

Finally, the present invention provides an efficient system for removing and exchanging the removable cutter bars and support chains. Storage carts having cutter bars and support chains for products of different dimensions are easily movable into place for installation.

With the flexibility provided by the present invention, there is no need to have dedicated cutting and packing lines for each different sized product. In addition, one cutting and packing machine can be changed over or reconfigured for a product having a different size without any significant retooling. Thus, the present invention provides significant advantages in both cost and time efficiency over prior systems.

Although the present invention has been described with reference to preferred embodiments, workers skilled in the art will recognize that changes may be made in form and detail without departing from the spirit and scope of the invention.

What is claimed is:

1. A dough cutting and packing apparatus, comprising:
   a plurality of cutting plates, each cutting plate having a plurality of openings, the cutting plates being supported adjacent one another to form an endless cutting unit;
   a rotatable member disposed relative to the cutting unit to press a dough sheet into the openings in the cutting plates to cut the dough sheet into a plurality of dough pieces, the plurality of dough pieces being retained in the openings in the cutting plates;
   a packing mechanism reciprocably mounted relative to the endless cutting unit to reciprocate and extend into the openings to remove the dough pieces;
   packing mechanism driver, coupled to the packing mechanism, configured to drive reciprocation of the packing mechanism;
   a modular container positioning mechanism configured to position a plurality of containers relative to the openings to receive the dough pieces after the dough pieces are removed by the packing mechanism, the modular container positioning mechanism including:
      a portable chassis, movable relative to the packing mechanism; and
      a container conveyor, movably coupled to the portable chassis, configured to move containers of a predetermined size from a position aligned with a first set of openings to positions aligned with subsequent sets of openings so the packing mechanism transfers dough pieces from the cutting unit to the containers until the containers are full;
   a driver, disconnectably coupled to the container conveyor, configured to drive the container conveyor; and
   a cutter drive assembly, coupled to the endless cutting unit, configured to advance the cutting plates relative to the reciprocating packing mechanism, the cutting plates being advanced with each reciprocation of the reciprocating packing mechanism.

2. The apparatus of claim 1 and further comprising:
   a frame supporting the endless cutting unit.

3. The apparatus of claim 2 wherein the portable chassis of the modular container positioning mechanism includes a first locator, and wherein the frame includes a second locator mateable with the first locator on the portable chassis to locate the modular container positioning mechanism relative to the frame and relative to the endless cutting unit.

4. The apparatus of claim 3 wherein the portable chassis includes an upper portion, movable with respect to a lower portion, the upper and lower portions being connected to a power actuator configured to move the upper portion relative to the lower portion, movement of the upper portion relative to the lower portion providing mateable connection between the first locator and the second locator.

5. The apparatus of claim 4 wherein the portable chassis comprises:
   a plurality of wheels coupled to a lower portion of the portable chassis.

6. The apparatus of claim 5 wherein the container conveyor comprises:
   a plurality of augers supported by the portable chassis as cantilevered beams extending within the endless cutting unit.

7. The apparatus of claim 6 wherein the driver comprises:
   a motor controller;

a servo motor; and a releasable linkage coupling the servo motor to the plurality of augers.

8. The apparatus of claim 7 wherein the cutter drive assembly comprises:

a servo motor coupled to the endless cutting unit, and controlled by the motor controller.

9. The apparatus of claim 1 wherein the container conveyor comprises:

an auger, rotatably mounted to the portable chassis, the auger having a thread with a thread dimension corresponding to a size of the containers, the containers being advanced in the thread of the auger, relative to the endless cutting unit, from a position aligned with a first set of openings to subsequent positions aligned with subsequent sets of openings to allow the packing mechanism to transfer dough pieces from the cutting unit to the containers until the containers are full.

10. The apparatus of claim 9 wherein the cutter drive assembly comprises a variable drive motor so the cutting plates are advanced by a variable distance based on the length of the cutting plates.

* * * * *